United States Patent [19]

Nagano

[11] Patent Number: 4,690,662
[45] Date of Patent: Sep. 1, 1987

[54] SPEED CONTROL DEVICE

[75] Inventor: Masashi Nagano, Izumi, Japan

[73] Assignee: Shimano Industrial Company Limited, Osaka, Japan

[21] Appl. No.: 888,161

[22] Filed: Jul. 22, 1986

[30] Foreign Application Priority Data

Jul. 29, 1985 [JP] Japan .................. 60-168295
Feb. 28, 1986 [JP] Japan ................... 61-44974

[51] Int. Cl.$^4$ .......................................... F16H 11/08
[52] U.S. Cl. ........................................ 474/69; 474/78
[58] Field of Search .............................. 474/69–71, 474/78, 80, 83

[56] References Cited

U.S. PATENT DOCUMENTS 4,215,872 8/1980 Clark .............................. 474/80 X
4,507,101 3/1985 Nagano ........................... 474/78 X

FOREIGN PATENT DOCUMENTS 60-56682 3/1985 Japan .

Primary Examiner—Stephen J. Novosad
Assistant Examiner—Thuy M. Bui
Attorney, Agent, or Firm—Stevens, Davis, Miller & Mosher

[57] ABSTRACT

The device is provided with a positioning mechanism having a positioning member, a switching mechanism for switching the positioning mechanism from an operating mode thereof to a non-operating mode and a friction mechanism for applying a resistance to rotation of the lever body when the positioning mechanism is switched to the non-operating mode. Gaps are provided between the positioning member and the lever body, whereby the positioning member is adapted to follow the rotation of the lever body with a predetermined delay when the positioning member is in the operating mode. When the positioning mechanism is switched to the non-operating mode, the positioning member follows the rotation of the lever body without delay because the rotational idling of the positioning member caused by the gaps is eliminated.

7 Claims, 20 Drawing Figures

SPEED CONTROL DEVICE

FIELD OF THE INVENTION

This invention relates to a speed control device used mainly for a bicycle, and more particularly, to a speed control device which supports a lever body rotatably to a fixing member fixed to the bicycle frame or the like, so that the lever body is rotated to actuate a derailleur, thereby selectively changing the bicycle speed among predetermined speed change stages.

DESCRIPTION OF THE PRIOR ART

The conventional bicycle speed control device of the type which supports rotatably to a fixing member a lever body for actuating the derailleur, includes two well-known types of components having a positioning mechanism provided with a positioning member rotatable in association with the lever body to set a desired speed change stage at the derailleur and an engaging member fixed to the fixing member and engageable with the positioning member; and a friction mechanism for applying to the lever body a rotational resistance against a return spring of the derailleur.

The present applicant has proposed a speed control device as disclosed in Japanese Patent Application No. Sho 60-56,682, which is provided with a positioning mechanism; a switching mechanism provided with an operating member which switches a positioning member at the positioning mechanism from the operating position thereof to the non-operating position so that, when the operating member is operated to switch the positioning member to the non-operating position, the lever body is given the rotational resistance against a return spring at the derailleur; and gaps provided at the associate portions of the lever body with the positioning member.

Such device changes the bicycle speed by actuating the positioning mechanism, or by switching the positioning mechanism to the non-operating stage to thereby apply the rotational resistance to the lever body. The reason for providing the gaps at the associate portions between the lever body and the positioning member is so that when the lever body is forwardly rotated against the return spring at the derailleur in the operating stage of the positioning mechanism, even if the lever body is rotated more than a predetermined range to allow a chain guide at the derailleur to shift over the center line of the width of a sprocket at the multistage sprocket assembly for changing the bicycle speed, the lever body is returned only by the width of the gap with respect to the operating amount of the lever body, thereby enabling the chain guide to correspond to the chain-shifted sprocket. In addition, the lever body, when rotated forwardly in a condition in which it is being given the rotational resistance, is adapted to be maintained in the operating position regardless of the gaps.

In the aforesaid speed control device, when the operating member is operated to switch the positioning member from the operating position thereof to the non-operation position and the lever body is given a rotational resistance R against a spring force F of the return spring to be used in the friction state, the operating member is operated to apply a rotational resistance $R_1$ to the lever body and the rotational resistance R is set to be the sum of the rotational resistance $R_1$ and resistance $R_2$ created between the positioning member switched to the non-operating position and the operating member. Hence, it is not problematical that the operating member is properly operated and the rotational resistance $R_1$ is sufficiently larger than the spring force F of the return spring. However, when the operating member is operated insufficiently so that $R_1$ is slightly larger or even slightly smaller than F, the vibrations or the like of the bicycle when driven, may cause the lever body to unexpectedly return to an extent of the gap by a restoring force of the return spring with respect to the positioning member, with the result that the chain shifted by the lever, according to the operating condition thereof, may automatically be shifted to another sprocket adjacent to the desired one. In other words, in a case where the lever body is not shifted over and the lever body returns only by the gaps, an amount of operation of the lever body decreases under the predetermined amount to result in the automatic shift of the chain to the adjacent sprocket.

SUMMARY OF THE INVENTION

An object of the present invention is to provide a speed control device which eliminates the idling of the lever body caused by gaps provided between a positioning member and the lever body when given a rotational resistance by a friction mechanism after switching a positioning mechanism from the operating position thereof to the non-operating position, so that even when an operating member is somewhat insufficiently operated during the aforesaid switching, the lever body is never returned through the gaps, thereby maintaining a chain guide at a derailleur in a proper position with respect to the chain-shifted sprocket.

In order to attain the above object, the speed control device of the present invention comprises:
(a) a fixing member;
(b) a lever body supported rotatably to the fixing member and for operating the derailleur;
(c) a positioning mechanism rotatable in association with the lever body and having a positioning member for setting the speed change stages at the derailleur;
(d) a switching mechanism provided with an operating member which is operated to switch the positioning mechanism from the operating state thereof to the non-operating state;
(e) a friction mechanism for applying to the lever body a rotational resistance overcoming a return spring at the derailleur when the operating member is operated to switch the positioning mechanism to its non-operating state;
(f) a delay means which is provided at an associate or engagement portion between the lever body and the positioning member with gaps through which the positioning member is caused to idle in a predetermined range with respect to the lever body, so that the positioning member follows the lever body in association with the rotation thereof with a predetermined rotational delay; and
(g) a delay negating means which negates the idling of the positioning member caused by the gaps with respect to the lever body when the operating member is operated to switch the positioning mechanism to its non-operating state, so that the positioning member follows the lever body in association with the rotation thereof without any rotational delay.

In the above-mentioned construction, the positioning mechanism is actuated to set the speed control position at every speed change stage, and the lever body rotates to be overshifted only by an amount of each gap with respect to the positioning member, thereby ensuring proper shifting of the chain. The lever body, when released after the chain is shifted, returns only by the amount of each gap with respect to the positioning member by means of a restoring force of the return spring at the derailleur, thereby enabling the chain guide thereof to be positioned corresponding to the sprocket to which the chain has been shifted.

When the operating member is operated to put the positioning mechanism in the non-operating state so as to actuate the friction mechanism, the idling of the positioning member caused by the gaps with respect to the lever body is eliminated, thereby maintaining the proper speed change position by the lever body without being affected by the gap. Hence, the problem is solved that the lever body is unexpectedly returned by the width of each gap to thereby automatically shift the chain to the sprocket adjacent to the chain-shifted sprocket.

The above and further objects and novel features of the invention will be more fully apparent from the following detailed description when the same is read in connection with the accompanying drawings.

DETAILED DESCRIPTION OF THE INVENTION

Figure 1:
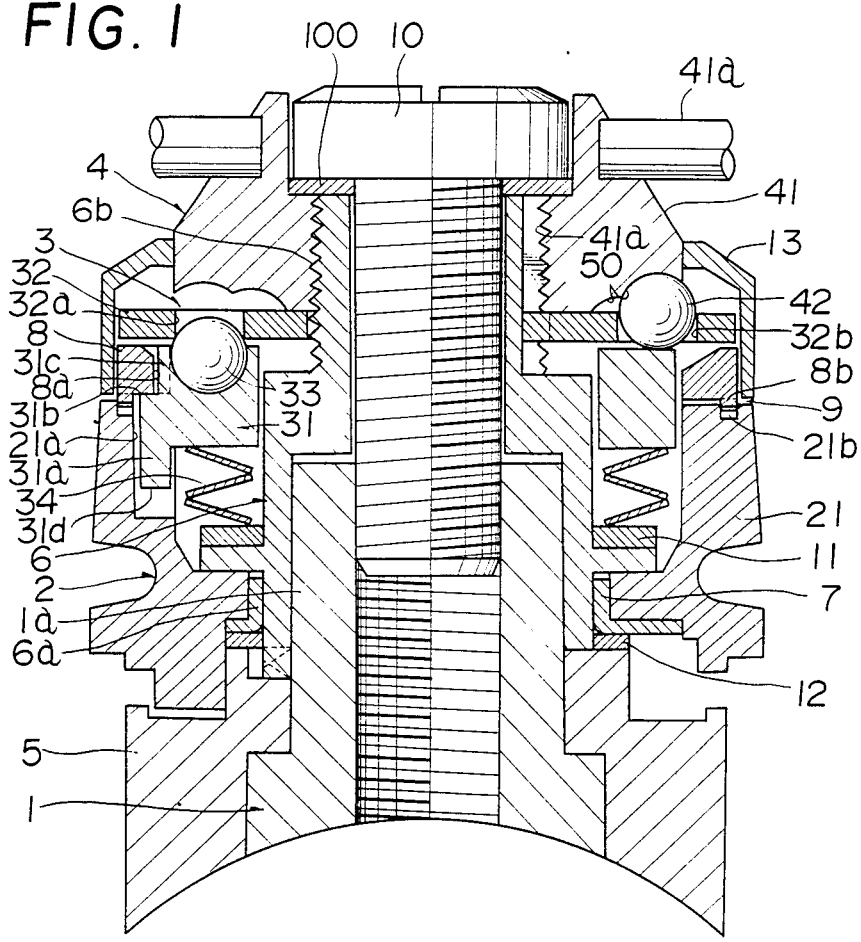
FIG. 1 is an enlarged longitudinal sectional view of a first embodiment of a speed control device of the invention.

The first embodiment in FIG. 1 is provided with a fixing member 1 having a lever shaft 1a, a lever body 2 supported rotatably to the lever shaft 1a, a positioning mechanism 3 provided with a positioning member 31 rotatable in association with the lever body 2 to set the speed change stage at a derailleur, a switching mechanism 4 provided with an operating member 41 which switches the positioning member 31 from the operating position of the positioning mechanism 3 to the non-operating position thereof, and a friction mechanism which is adapted to apply to the lever body 2 a rotational resistance corresponding to a return spring at the derailleur when the operating member 41 is operated to switch the positioning member 31 to the non-operating position. The fixing member 1 is welded to the bicycle frame and supports at its base non-rotatably a cylindrical adapter 5. A cylindrical fixed bush 6 comprises a larger diameter portion 6a and a smaller diameter portion 6b smaller in diameter than the portion 6a and having at the outer periphery a screw thread and axially extending splines. Bush 6 is detachably supported to the lever shaft 1a and is retained at one end thereof non-rotatably onto the end face of the adapter 5.

The lever body 2 comprises a boss 21 having a through bore and an operating portion (not shown) extending radially outwardly from one side of the boss 21, the boss 21 being supported rotatably to the larger diameter shaft portion 6a through a flanged collar 7.

Figure 2:
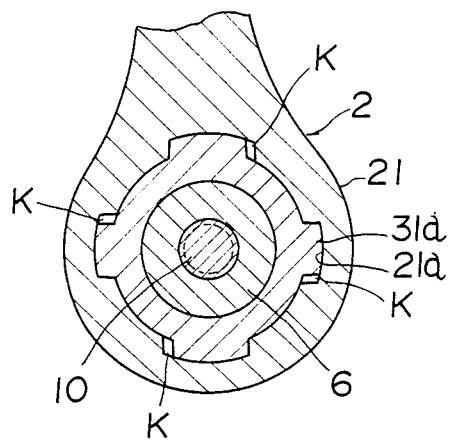
FIG. 2 is a cross-sectional view of an associate portion of a lever body with a positioning member.
Figure 3:
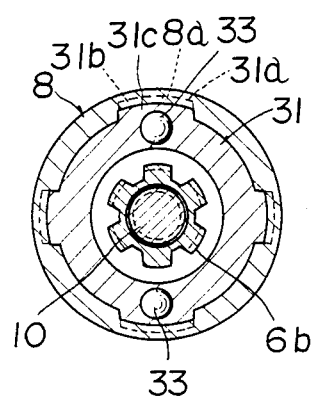
FIG. 3 is a cross-sectional view of the positioning member.
Figure 4:
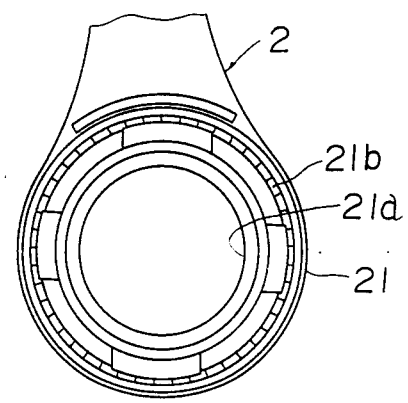
FIG. 4 is a partial plan view of a lever body only.
Figure 5:
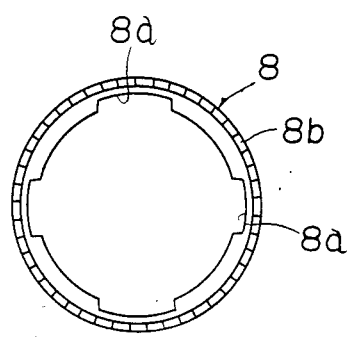
FIG. 5 is a plan view of a friction member only.
Figure 6:
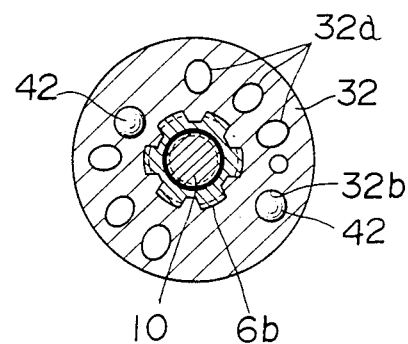
FIG. 6 is a cross-sectional view of an engaging member.

The positioning mechanism 3 comprises a disc-like engaging member 32 having engaging portions 32a corresponding to the speed change stages of the derailleur respectively and two through bores 32b, and the annular positioning member 31 having a rolling member 33 engageable with at least one of the engaging portions 32a. The engaging member 32 is supported non-rotatably and axially movably to the smaller diameter shaft portion 6b at the bush 6, and the positioning member 31 is supported rotatably and axially movably to the larger diameter shaft portion 6a at the same. Between the positioning member 31 and an annular projection provided at an intermediate portion of the larger diameter shaft portion 6a are interposed compression springs 34 for biasing the positioning member 31 toward the engaging member 32. A plurality of engaging projections 31a, as shown in FIGS. 2 and 3, are provided at the outer periphery of one axial side, of positioning member 31 and engaging recesses 21a engageable with the engaging projections 31a respectively are provided at the inner periphery of the through bore at the boss 21 of the lever body 2, so that the positioning member 31 is adapted to engage with the rotation of lever body 2. As shown in FIG. 2, between the engaging projections 31a and the engaging recesses 21a are provided gaps K respectively, the gaps K each allowing the lever body 2 to rotate slightly with respect to the positioning member 31 so that the lever body 2, when operated forwardly, is returned corresponding to an amount of overshift. The gaps K allow the positioning member 31 to idle with respect to the lever body 2. As a result, when the lever shaft 2 is rotated forwardly, the positioning member 31 follows the lever body 2 with a delay corresponding to each gap K. Thus, engaging recesses 21a and engaging projections 31a constitute first and second delay members respectively, which cooperate to cause the above-described idling operation with a delay corresponding to each gap K.

Also, the engaging member 32 has a larger outer diameter than the positioning member 31, and a substantially ring-shaped friction member 8 constituting a friction mechanism is interposed between the lower surface at the circumferential portion of the engaging member 32 and the upper surface of the boss 21.

The switching mechanism 4 comprises the operating member 41 and two global pushers 42 interposed between the operating member 41 and the positioning member 31. The operating member 41 has at its center a threaded bore 41a screwed with the smaller diameter shaft portion 6b at the bush 6, and abuts at one end face against the engaging member 32. As a result, a rotational operating force of the operating member 41 is transmitted directly to the engaging member 32 and the engaging member 32 is axially moved by the forward screwing of operating member 41. Also, the pushers 42 are inserted into the through bores 32b at the engaging member 32 respectively, and the rotational operating force of the operating member 41 is transmitted to the positioning member 31 through the pushers 42, so that the axial movement of the positioning member 31 is made larger than that of the engaging member 32 through a movement control means to be discussed in detail below.

Between the lever body 2 and the positioning member 31 is interposed a delay negating means which, when the positioning member 31 is switched to the non-operating state, eliminates the idling of the positioning member 31 in a range of each gap K with respect to the lever body 2 so that the positioning member 31 rotates in concert with the rotation of lever body 2 without rotational delay.

The delay negating means of the first embodiment uses a locking meachanism 9 for locking the idling of positioning member 31 with respect to the lever body 2. Lock mechanism 9 is formed as follows. At the outer periphery of the positioning member 31 and above the engaging projections 31a are provided locking projections 31c through holding shoulders 31b. Locking recesses 8a engageable with the locking projections 31c are provided at the friction member 8 supported non-rotatably relative to the holding shoulders 31b, and teeth 8b and 21b engageable with each other are provided at the lower surface at the circumferential portion of the friction member 8 and at the upper surface of the boss 21 respectively. As a result, when the positioning member 31 is put in the operating position, the friction member 8 moves away from the boss 21 to thereby keep the teeth 21b and 8b non-engaged. Also, when the positioning member 31 is switched to the non-operating position, the friction member 8 together with the positioning member 31 is moved toward the boss 21 to thereby cause teeth 21b and 8b to engage with each other. Hence, the positioning member 31 is locked not to rotate in a range of each gap K with respect to the lever body 2.

Also, the switching mechanism 4 in the first embodiment is provided between the operating member 41 and the positioning member 31 with a movement control means which moves the positioning member 31 toward the non-operating position and thereafter decreases an amount of movement of the positioning member 31 with respect to that of the operating member 41.

The movement control means comprises cam means 50 at the lower surface of the operating member 41.

Figure 7:
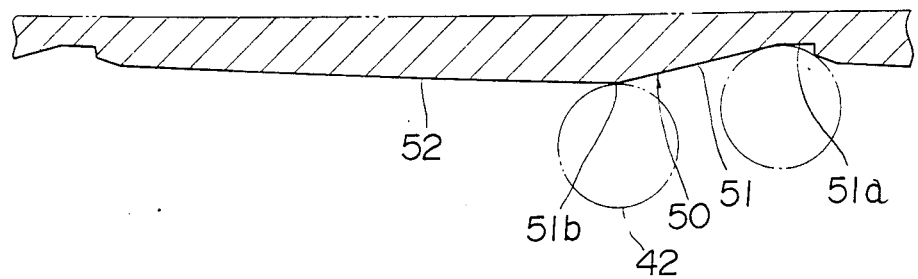
FIG. 7 is an enlarged developed view of a cam means constituting a movement control means.
Figure 8:
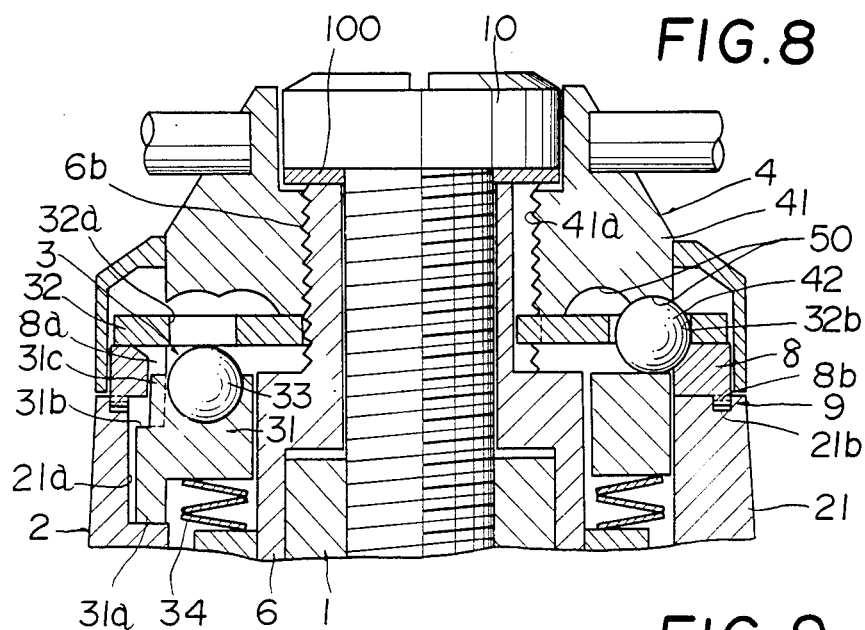
FIG. 8 is a partial enlarged sectional view of the positioning member switched to the non-operating state.

The cam means 50 are slanted circumferentially and axially of the operating member 41, and, as shown in FIG. 7, each has a low cam surface 51a engageable with one pusher 42 when the positioning member 31 is put in the operating position and a high cam surface 51b engageable with the pusher 42. Each of cam means 50 also comprises a propulsion cam surface 51 slanted axially outwardly from the low cam surface 51a to the high cam surface 51b and a declination cam surface 52 slanted axially inwardly from the high cam surface 51b, in other words, reversely to the propulsion cam surface 51. The cam means 50 are provided side by side at two radially outward and radially inward portions at the lower surface of the operating member 41.

The declination cam surface 52 continues at its utmost end with the low cam surface 51a, so that the operating member 41 is once rotated to switch the positioning member 31 from the operating position to the non-operating position and thereafter the lever body 2 is adapted to be given the predetermined rotational resistance. Also, it is preferable that the declination cam surface 52 is formed to make zero the amount of movement of the positioning member 31 with respect to that of the operating member 41 after switching the positioning member 31 to the non-operating position, but the cam surface 52 need only be formed to decrease the amount of movement of the positioning member 31 with respect to that of the operating member 41.

The low cam surface and high cam surface of the respective cam means provided radially outwardly and inwardly of the member 41 are displaced at an angle of 180° respectively.

In addition, in FIG. 1, reference numeral 10 designates a mounting screw screwable with a threaded bore at the lever shaft 1a through a washer 100, 41a designates a substantially C-shaped handle provided at the operating member 41, 11 designates a spring seat washer, 12 designates a washer, and 13 designates a cup.

The speed control device of the present invention constructed as above-mentioned and shown in FIG. 1, keeps the positioning member 31 in the operating position of the positioning mechanism 3, so that the friction member 8 leaves the boss 21, the teeth 21b and 8b disengaging from each other, and each pushed 42 engaging with the low cam surface 51a at the cam means 50 as shown by the one-dotted chain line in FIG. 7. The lever body 2 in this state is freely rotatable against the return spring at the derailleur by the amount of gap K with respect to the positioning member 31. In other words, the positioning member 31 is stationary until the engaging recesses 21a engage with the engaging projections 31a respectively, but, after the engagement, is integral with the lever body 2.

When the lever body 2 is further forwardly rotated, the positioning member 31 rotates together with the lever body 2 by the pitch between the engaging portions 32a with respect to the engaging member 32. As a result, the lever body 2 rotates excessively only by the amount of gap K. The excessive rotation of the same causes a chain guide at the derailleur to be overshifted with respect to each sprocket at the multistage sprocket assembly, thereby ensuring the shifting of the chain to a desired sprocket.

Next, the lever body 2, when released, returns by the restoring force of the return spring by an amount corresponding to the width of gap K and then is held in the proper position set by the positioning mechanism 3. Also, the chain guide returns corresponding to the positioning member 31 and stops at the proper position with respect to a desired sprocket.

Next, the operating member 41 is screwed to apply to the lever body 2 a rotational resistance against the return spring after the positioning member 31 is switched from the operating position to the non-operating position, whereby the engaging member 32 is urged and the positioning member 31 together therewith moves against an urging spring 34. Low cam surfaces 51a disengage from the pushers 42 with the result that the propulsion cam surfaces 51 engage with the global members 42 respectively. The engagement position of each propulsion cam surface 51 with each pusher 42 changes sequentially, and the positioning member 31 moves away from the engaging member 32 against the springs 34. Each pusher 42 engages with the high cam surface 51b, and a rolling member 33 disengages from the engaging portion 32a, thereby switching the positioning member 31 to the non-operating position. The engaging member 32 moves by the operating member 41 to contact with the friction member 8 so that the teeth 8b thereat engage with the teeth 21b at the lever body 2, thereby blocking the rotation of friction member 8 with respect thereto. As a result, the rotation of positioning member 31 is locked with respect to the lever body 2 through the friction member 2.

After the positioning member 31 is switched to the non-operating position, when the operating member 41 is further screwed forwardly, the friction member 8 is brought into press-contact with the boss 21 to apply to the lever body 2 a rotational resistance R against the restoring force of the return spring at the derailleur.

In this case, in a state where the operating member 41 is short in the amount of proper operation and the rotational resistance R given to the lever body 2 itself is slightly larger or smaller than the restoring force F of the return spring, even when the lever body 2 is operated to change the speed at a desired speed change state, the rotation of positioning member 31 with respect to the lever body 2 is locked. As a result there is no risk that the lever body 2 will unexpectedly return by the width of each gap K caused by vibrations or the like during the running of the bicycle.

In a case where the operating member 41 is further screwed forward after the positioning member 31 is switched to the non-operating position, each declination cam surface 52 engages with each pusher 42 to sequentially change the engaging position thereof, whereby the amount of movement of positioning member 31 decreases with respect to that of the operating member 41, for example, it becomes zero. Accordingly, the operating force to move the positioning member 31 is not required, so that the operating member 41 need only be subjected to an operating force only for applying to the lever body 2 a rotational resistance against the return spring at the derailleur by bringing the friction member 8 into press-contact with the lever body 2. Thus, the friction caused by the operating member 41 after switching to the non-operating position is adjustable by a light touch.

In a case where the positioning member 31 is switched from the state where the lever body 2 is given the predetermined resistance to the state where the positioning mechanism 3 is actuated, the operating member 41 is unscrewed to change the engaging position of each declination cam surface 52 with each pusher 42 sequentially toward the high cam surface 51b to thereby release the friction member 8 from the lever body 2 and also disengage the teeth 21b and 8b from each other. The pushers 42 further ride over the high cam surfaces 51b and engage with the propulsion cam surfaces 51, the positioning member 31 moving toward the engaging member 32 through a spring force of each urging spring 34. Then, the engaging positions of propulsion cam surfaces 51 with the pushers 42 change sequentially toward the low cam surfaces 51b, and the rolling members 33 engage with the engaging portions 32. Low cam surfaces 51a engage with the pushers 42 respectively, thereby switching the positioning member 31 to the operating position.

Alternatively, in the first embodiment, the rolling members 33 may be replaced by engaging projections or a plurality of engaging portions corresponding to the speed change stages at the derailleur respectively, which is not particularly defined. In brief, the positioning member 31 need only rotate in association with the lever body 2 to set the speed change stages at the derailleur. Also, when the positioning member 31 has the plurality of engaging portions, the engaging member 32 is provided with rolling members or engaging projections, engageable with the engaging portions at the engaging member 32 respectively.

Alternatively, the engaging member 32 at the positioning mechanism 3 may be formed not particularly to move, thus not defining or limiting the construction of the switching mechanism 4.

The locking mechanism 9 may alternatively be so constructed that between the end face 31d of each engaging projection 31a at the positioning member 31 and the surface at each engaging recess 21a at the boss 21 opposite to the end face 31d, for example, teeth 21b and 8b engageable with each other are provided, thereby directly locking the rotation of the positioning member 31 with respect to the lever body 2. Thus, the locking mechanism is not particularly defined by its construction. In brief, the positioning member 31, when switched to the non-operating position, need only have its rotation locked in a range of each gap K with respect to the lever body 2.

Next, a second embodiment of the invention shown in FIGS. 9 through 17 will be explained.

The second embodiment is provided with a moving means comprising a positioning member 35 having a plurality of engaging portions 35a and a friction member 80, which are radially disposed; and global engaging members 36 which are engageable with each of the engaging portions 35a and radially movable. Global members 36 move across the positioning member 35 and friction member 80 to thereby disengage from the positioning member 35 and engage with the friction member 80. The positioning member 35 is provided with an auxiliary spring 40 for biasing the positioning member 35 in one direction, preferably reversely to the biasing direction of the return spring at the derailleur, with respect to the lever body 2, so that when the positioning mechanism is switched to the non-operating state, the auxiliary spring 40 biases the positioning member 35 to be in press-contact with the lever body 2, thereby locking the idling of positioning member 35 with respect thereto.

The second embodiment is not different in its basic construction from the first embodiment, in which a bush 60 supported detachably to a fixing member 1 is provided with a support shaft portion 60c supporting a boss 21 at a lever body 2. Lever body 2 is supported rotatably to the support shaft portion 60c, and a plurality of engaging portions 35a for setting the speed change stages are provided at the positioning member 35 constituting a positioning mechanism 3. Positioning member 35 is supported rotatably to a medium diameter shaft portion 60d at the bush 60, and engaging members 36 each engageble selectively with one of the engaging portions 35a is made spherical and held to a holder 14 supported non-rotatably to a smaller diameter shaft portion 60b at the bush 60, so that an urging member 15 formed of a leaf spring biases the engaging members 36 toward the positioning member 35.

Figure 12:
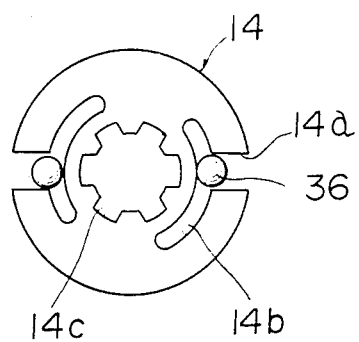
FIG. 12 is a plan view showing a relationship between an engaging member and a holder of the second embodiment.

The holder 14 holding the engaging members 36 comprises a disc having at its center a bore 14c to be fitted non-rotatably onto the smaller diameter shaft portion 60b at the bush 60. Holder 14 is provided with holding bores 14a extending radially of the holder 14 and escape bores 14b extending circumferentially of the same as shown in FIG. 12. Holding bores 14a hold therein the engaging members 36 such that they are displaceable radially of the holder 14.

Figure 14:
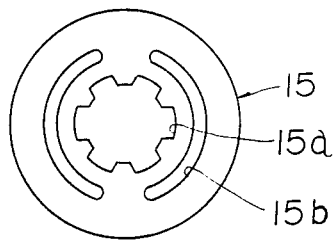
FIG. 14 is a plan view of an urging member only of the second embodiment.

The urging member 15 for biasing the engaging members 36, as shown in FIG. 14, has at its center a bore 15a to be fitten non-rotatably onto the smaller diameter shaft portion 60b at the bush 60 and at the outer peripheral portion escape bores 15b.

Figure 11:
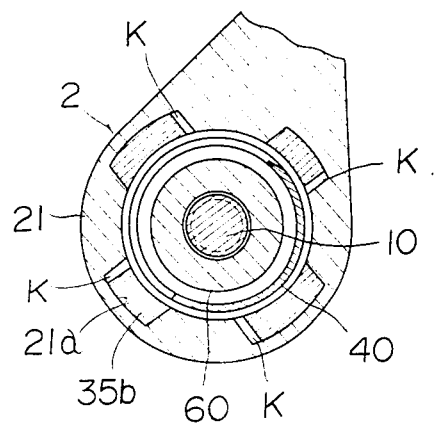
FIG. 11 is a cross-sectional view of an associate portion of a lever body with the positioning member of the second embodiment.

The positioning member 35 is provided circumferentially at one side surface with a plurality of engaging projections 35b and the boss 21 is provided at the inner periphery of the through bore thereof with engaging recesses 21a engageable with the engaging projections 35b respectively, thereby rotating the positioning member 35 in association with the lever body 2. Also, as shown in FIG. 11, between the engaging projections 35b and the engaging recesses 21a are provided gaps K respectively, so that, when the lever body 2 is rotated forwardly, the positioning member 35 follows the lever body 2 with a predetermined delay.

The friction member 80 is supported non-rotatably to the end face of the boss 21 at the lever body 2, and a moving means is provided, which displaces the engaging members 36 radially of the lever body 2, in other words, perpendicularly to the axis of rotation thereof so as to disengage the engaging members 36 from the positioning member 35 and engage the same with the friction member 80.

Figure 13:
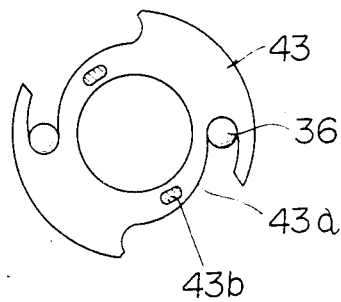
FIG. 13 is a plan view showing a relation between the engaging member and a guide of the second embodiment.

The moving means constitutes a switching mechanism which switches the positioning mechanism 3 from the operating state thereof to the non-operating state and simultaneously applies the rotational resistance to the lever body 2 and switches the friction mechanism to its operating state. The moving means comprises a guide 43 engageable with each engaging member 36 and shifts it radially of the holder 14 and an operating member 44 for operating the guide 43. The guide 43, as shown in FIG. 13, comprises an annular plate having guide portions 43a extending circumferentially and radially outwardly from the portions opposite to the engaging members 36, is supported rotatably to the smaller diameter shaft portion 60b at the bush 60 through a washer 45 fitted non-rotatably thereto, and is provided with retaining bores 43b.

The operating member 44 is supported rotatably to the smaller diameter shaft portion 60b through a fixing nut 16 screwed therewith. At the lower end face of the operating member 44 is provided a transmission arm 44a to be fitted into one retaining bore 43b, thereby transmitting the rotation of operating member 44 to the guide 43.

Figure 15:
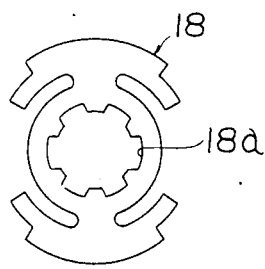
FIG. 15 is a plan view of a clutch spring only of the second embodiment.
Figure 16:
FIG. 16 is a front view of the clutch spring.

Also, the operating member 44 is made axially movable with respect to the fixing nut 16. Between the operating member 44 and the fixing nut 16 is provided a claw clutch 17 disposed axially opposite of the operating member 44. A clutch spring 18 is provided to bias the claw clutch 17 in a permanently engaged condition. In addition, the clutch spring 18, as shown in FIGS. 15 and 16, comprises a leaf spring having a center bore 18a to be fitted non-rotatably to the smaller diameter shaft portion 60b, the claw clutch 17 comprising engaging teeth each of a V-like shap in section and provided circumferentially at the opposite faces of the operating member 44 and fixing nut 16.

In the second embodiment, between the positioning member 35 and the bush 60 is interposed an auxiliary spring 40 which biases the positioning member 35 in the reverse direction to the biasing direction of the return spring at the derailluer. Auxiliary spring 40 reduces an operating force necessary for the lever body 2 when forwardly operated. Also, the auxiliary spring 40 constitutes a delay negating means which, after the engaging members 36 move toward the friction member 80, brings the positioning member 35 in press-contact with the lever body 2, thereby negating the aforesaid idling. Also, the operating member 44 is provided with a substantially C-shaped handle 44a in relation of rising and falling. In addition, in FIG. 9, reference numeral 45 designates a washer.

In the second embodiment, the fixing bush 60, lever body 2, positioning member 35, engaging members 36, urging member 15, holder 14, friction member 80, operating member 44, guide 43, washer 45 and clutch spring 18 are unitized by screwing the fixing nut 16 with the bush 60.

Figure 9:
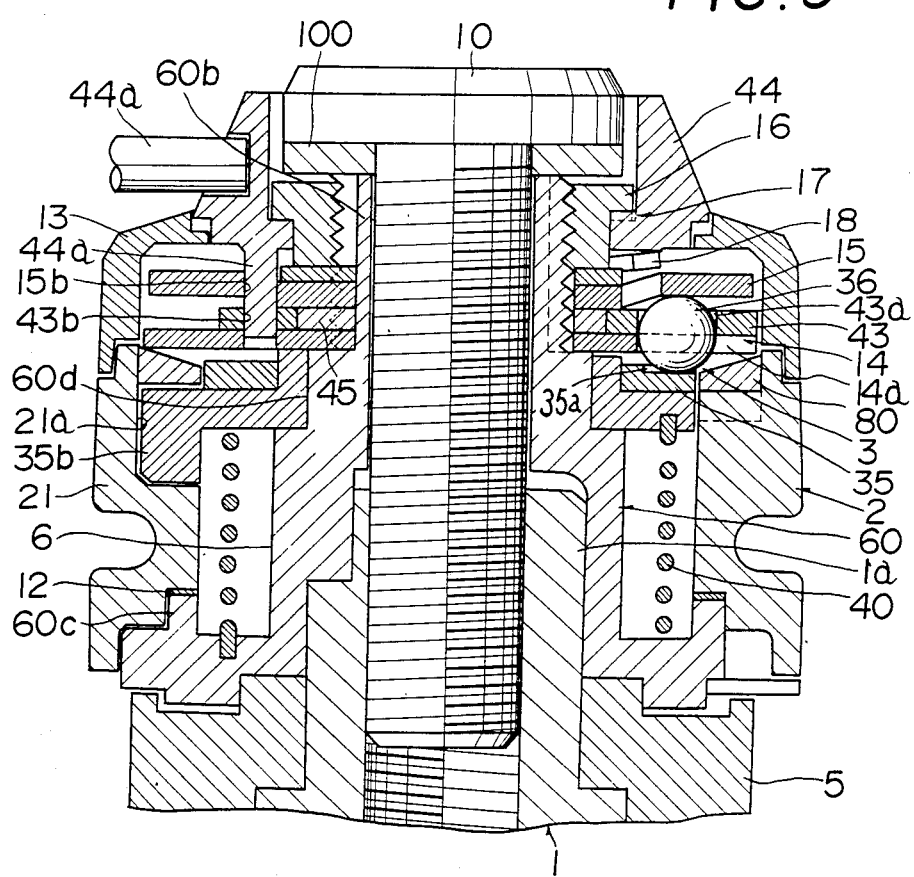
FIG. 9 is an enlarged longitudinal sectional view of a second embodiment of the invention.
Figure 10:
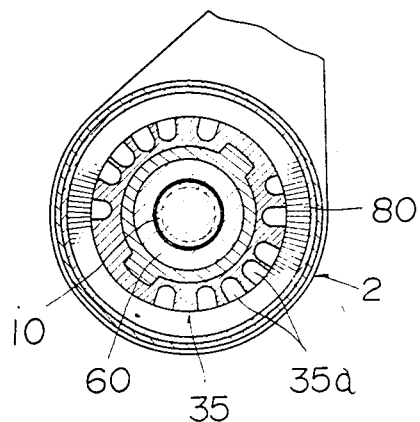
FIG. 10 is a cross-sectional view of a positioning member of"; the second embodiment in FIG. 9.

Also, in the second embodiment, when the positioning mechanism 3 is actuated, each engaging member 36, as shown in FIG. 9, engages with one of the engaging portions 35a, so that, in the condition shown in FIG. 9, the lever body 2, when rotated, freely rotates only the width of the gap K with respect to the positioning member 35 against the return spring at the derailleur, whereby the engaging recesses 21a engage with the engaging projections 35b respectively to integrate the lever body 2 with the positioning member 35.

When the lever body 2 is further rotated forwardly, the positioning member 35 rotates following the lever body 2 only by the pitch between the engaging portins 35a, the lever body 2 rotating excessively only by the width of gap K, whereby a chain guide at the derailleur is overshifted with respect to each sprocket at the multistage sprocket assembly, thereby shifting to the desired sprocket the chain guided by the chain guide.

Figure 17:
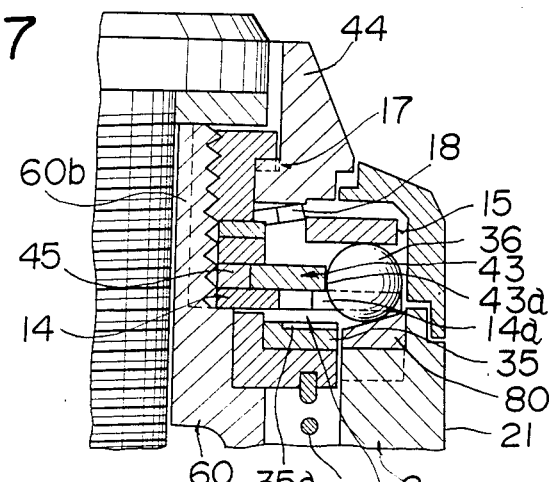
FIG. 17 is a partial enlarged sectional view of the second embodiment switched to the friction mode.

Next, in a case where the lever body 2 is given a rotational resistance against the return spring at the derailleur so as to actuate the friction mechanism in the operating state of positioning mechanism 3, the operating member 44 in FIG. 9 is pushed and moved axially with respect to the fixing nut 16 so as to disengage the claw clutch 17, thereby rotating in one direction. Hence, the rotation of operating member 44 is transmitted to the guide 43 through the transmitting arm 44a, and the guide 43 rotates together with the operating member 44. Each engaging member 36, as shown in FIG. 17, shifts radially outwardly of the positioning member 35 along the guide portion 43a at the guide 43, thereby disengaging the engaging member 36 from the engaging portion 35a. Hence, the positioning member 35 is freely rotatable in a range of the gap K with respect to the engaging members 36, so that the positioning member 35 is brought elastically into press-contact with the lever body 2 by virtue of the auxiliary spring 40, thereby locking the idling of the positioning member 35 with respect to the lever body 2. Meanwhile, the engaging member 36 engages with the friction member 80, whereby the lever body 2 is given therethrough a rotational resistance against the return spring at the derailleur.

In addition, the operating member 44, when released from the operator's hand after being rotated, returns axially by virtue of the clutch spring 18, thereby engaging the claw clutch 17 to block the rotation of operating member 44.

Also, in the second emnodiment, the positioning member 35 and friction member 80 are juxaposed radially of the lever shaft 1a, the positioning member 35 being disposed radially inwardly, the friction member 80 radially outwardly. Alternatively, the positioning member 35 may be disposed radially outwardly and the friction member 80 radially inwardly.

In this case, the engaging portions 35a at the positioning member 35 can have larger positioning intervals than those of the same disposed radially inwardly as in the second embodiment, thereby ensuring the engagement of the engaging member 36 with each engaging portion 35a to that extent.

Figure 18:
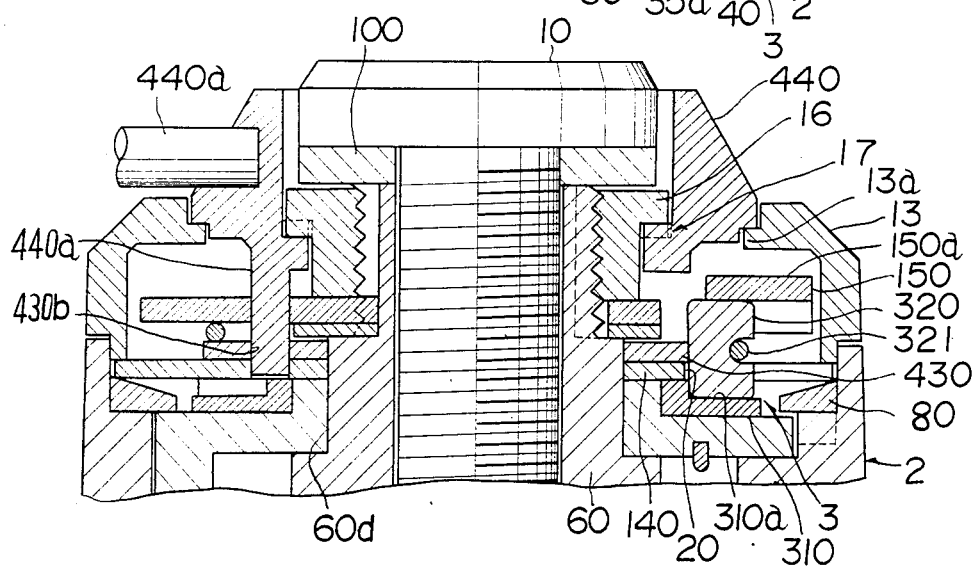
FIG. 18 is a partial enlarged sectional view of a third embodiment of the invention.
Figure 19:
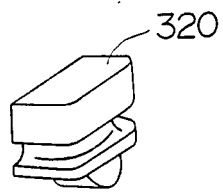
FIG. 19 is a perspective view of an engaging member only at the third embodiment.
Figure 20:
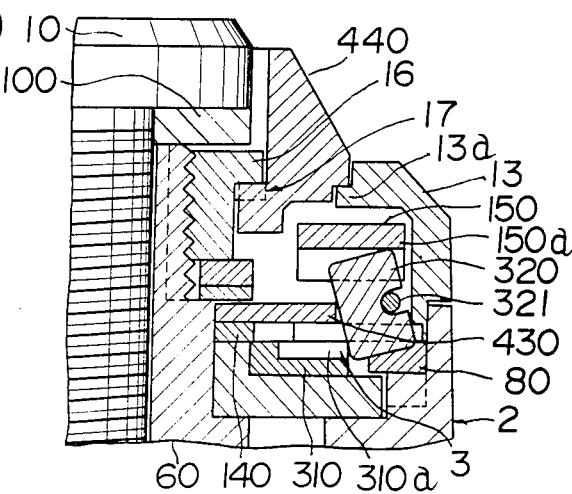
FIG. 20 is a partial enlarged sectional view of the third embodiment switched to a friction state.

Alternatively, the engaging member 36 may be formed as shown in FIGS. 18 through 20.

Referring to FIGS. 18 through 20, a third embodiment of the invention is shown, in which, an engaging member 320 uses a pair of pawl members each having an engaging portion engageable with each engaging portion 310a at a positioning member 310. The engaging member 320 is held at a radially extending semicylindrical holding portion 150a of a substantially disc-shaped urging spring 150 to be displaceable along the holding portion 150a, and a ring spring 321 for biasing the engaging members 320 radially inwardly of the urging spring 150 is provided outside the engaging member 320, so that an operating member 440 is rotated to shift the engaging member 320 perpendicularly to the axis of rotation of the lever body 2.

In this embodiment, a holder 140 and a guide 430 are supported rotatably to a medium diameter shaft portion 60d at a bush 60. A cup 13 of synthetic resin is provided at an intermediate portion with a thin portion so as to be elastically axially deformable, and at the bottom with a support projection 13a abutting against the axial end face of the operating member 440, so that an elastic force of the cup 13 engages a claw clutch 17.

In the third embodiment in FIGS. 18 through 20, it is preferable that at the opposite surfaces of the guide 430 and spring 150 are provided a pair of engaging projections projecting axially and having slopes engageable with each other by the rotation of guide 430, so that when the operating member 440 rotates, the engaging projections engage with each other to deflect the spring 150 in the direction of moving away from the engaging member 320 to reduce a load applied thereto, thereby facilitating the displacement of the engaging member 320.

In a case of using a global member as shown in FIG. 9, for example, a semicylindrical holding portion extending radially is provided at the surface of the spring 15 opposite to the engaging member 36, thereby holding by the holding portion the engaging member 36 without using the holder 14.

The means to maintain the rotatably operating position of the operating member 44 or 440 constituting the moving means may alternatively use the handle 44a or 440a such that the handle may be sharpened at the tip and the tip may pass through the operating member to enter the inside thereof, or splines engageable with the sharp tip of the handle may be provided at the outer periphery of the head of the mounting screw 10. In this case, the operating member 44 or 440 may be provided with a cam face to radially expand the handle when operated, so that the tip disengages from the splines when the operating member is rotated.

Alternatively, the cup 13 may be utilized instead of the clutch spring 18 and provided with a support elastically deformable and abutting against the axial end face of the operating member 44 or 440, thereby engaging the claw clutch 17 by means of the elastic force of the support.

Also, the operating member 44 or 440 may alternatively be provided with engaging recesses at two operating positions where the engaging member 32 or 320 engages with the engaging portion 35a or 310a and with the friction member 80; and an engaging projection selectively engageable with one of the engaging recesses, thereby maintaining at the two positions only the operating position of the operating member 44 or 440.

Alternatively, in the second embodiment, the guide portion 43a at the guide 43 may be provided with a plurality of recesses engageable with the engaging members 36, thereby rotating the operating member 44 with a clicking feel.

Also, the guide portion 43a may alternatively be formed in an elongate slot having an inner guide surface and an outer guide surface. As a result, each engaging member 36, when shifted from the position where it engages with the engaging portion 35a to the position where it engages with the friction member 80, may be guided by the inner guide surface, and when shifted from the position where the same engages with the friction member 80 to that where the same engages with the engaging portion 35a, may be guided by the outer guide surface. In this case, the recesses may be provided at the inner and outer guide surfaces, thereby rotating the operating member 44 in any direction with the clicking feel. Alternatively, the engaging recesses engageable with the engaging member 36 may be provided only at the two positions where each engaging member 36 engages with the friction member 80 at the end of inner guide surface and the engaging member 36 engages with the engaging portion 35a at the end of outer guide surface, thereby ensuring that the positioning mechanism 3 or the friction mechanism is sensed to be put in the operating state.

The moving means constituting the switching means in the above embodiment may alternatively have an operating member movable perpendicularly to the axis of rotation of the lever body 2, which is not particularly defined by its construction.

Although several embodiments have been described, they are merely exemplary of the invention and not to be construed as limiting, the invention being defined solely by the appended claims.

What is claimed is:

1. A speed control device for operating a derailleur which includes a return spring, said speed control device comprising:

a fixing member;

a lever body rotatably supported relative to said fixing member, said lever body for operating said derailleur;

a positioning mechanism including a positioning member rotatable with said lever body about said fixing member, said positioning member for setting speed change stages of said derailleur;

a switching mechanism including an operating member, said operating member for selectively switching said positioning mechanism between an operating mode and a non-operating mode;

a friction mechanism for applying to said lever body a rotational resistance overcoming said return spring of said derailleur in response to said operating member being operated to switch said positioning mechanism to said operating mode, said friction mechanism for releasing said rotational resistance in response to said operating member being operated to switch said positioning mechanism to said non-operating mode;

said lever body comprising a first delay member and said positioning mechanism comprising a second delay member, said first delay member and said second delay member being angularly spaced apart to provide a gap therebetween, said first delay member and said second delay member cooperating to cause said positioning mechanism to idle in a predetermined rotation range of said lever body and to rotate with said lever body after a predetermined rotational delay corresponding to said gap; and a delay negating means, responsive to said operating member switching said positioning mechanism to said non-operating mode, for negating said predetermined rotational delay and for causing said positioning member to rotate in concert with said lever body without any rotational delay.

2. A speed control device according to claim 1, wherein said delay negating means is provided with a locking mechanism which, when said positioning mechanism is switched to the non-operating mode, couples said positioning member with said lever body to prevent idling of said positioning member with respect to said lever body.

3. A speed control device according to claim 2, wherein said friction mechanism is provided with a friction member which contacts with said lever body to apply thereto a rotational resistance in response to switching of said positioning mechanism to the non-operating mode, said friction member being supported non-rotatably with respect to said positioning member, said locking mechanism being provided between said friction member and said lever body.

4. A speed control device according to claim 1, wherein said positioning mechanism is provided with at least one engaging member disposed opposite to said positioning member in an axial direction of said lever body, said positioning member and said engaging member being supported movably in the axial direction of said lever body, said positioning member undergoing axial movement in response to operation of said operating member which is larger than an axial movement of said engaging member in response to operation of said operating member, so that said operating member is operable to selectively position said positioning member in the non-operating mode, said friction mechanism being provided with a friction member which is biased, responsive to axial movement of said engaging member, against said lever body to thereby apply said rotational resistance to said lever body, and said delay negating means is provided with a locking mechanism, responsive to said positioning member being switched to said non-operating mode and said engaging member biasing said friction member against said lever body, for coupling said positioning member with said lever body to thereby prevent idling of said positioning member with respect to said lever body.

5. A speed control device according to claim 1, wherein said positioning member is provided with an auxiliary spring for biasing said positioning member in one direction with respect to said lever body, so that when said positioning mechanism is switched to said non-operating mode, a biasing force of said auxiliary spring causes said positioning member to make elastic press-contact with said lever body to thereby prevent idling of said positioning member with respect to said lever body.

6. A speed control device according to claim 5, wherein said positioning member is provided with a plurality of engaging portions for setting the speed change stages, said friction mechanism being provided with a friction member for applying a rotational resistance to said lever body, said positioning member and friction member being juxtaposed radially of said lever body, said positioning mechanism being provided with engaging members engageable with said engaging portions respectively, said engaging members being disposed to be movable radially of said lever body, said switching mechanism being provided with a moving means which allows said engaging members to move in response to operation of said operating member radially of said lever body across said positioning member and friction member, thereby disengaging said engaging members from said positioning member and engaging the same with said friction member.

7. A speed control device according to claim 5, wherein said auxiliary spring biases said positioning member in a direction opposite to a biasing direction of said return spring of said derailleur to lighten an operation of a control lever.

* * * * *

UNITED STATES PATENT AND TRADEMARK OFFICE
CERTIFICATE OF CORRECTION

PATENT NO. : 4,690,662

DATED : September 1, 1987

INVENTOR(S) : Masashi NAGANO

It is certified that error appears in the above-identified patent and that said Letters Patent is hereby corrected as shown below:

<u>IN THE CLAIMS</u>

Claim 1, line 20, change "operating" to -- non-operating --;

line 24, change "non-operating" to -- operating --.

Signed and Sealed this

Seventh Day of November, 1989

*Attest:*

JEFFREY M. SAMUELS

*Attesting Officer*     *Acting Commissioner of Patents and Trademarks*